United States Patent [19]

Rorant

[11] Patent Number: 4,979,330
[45] Date of Patent: Dec. 25, 1990

[54] SUCTION INSECT TRAP DEVICE

[76] Inventor: Julius W. Rorant, 55 Gerry St., Greenwich, Conn. 06830

[21] Appl. No.: 419,372

[22] Filed: Oct. 10, 1989

[51] Int. Cl.⁵ .............................................. A01M 1/06
[52] U.S. Cl. ........................................ 43/139; 55/367
[58] Field of Search ...................... 43/132.1, 133, 138, 43/139; 15/344, 402; 55/367, 374

[56] References Cited

U.S. PATENT DOCUMENTS

| | | | |
|---|---|---|---|
| 2,300,765 | 11/1942 | Barnhart | 55/367 |
| 3,330,063 | 7/1967 | Lockwood | 55/367 |
| 3,383,030 | 5/1968 | Downey | 55/367 |
| 3,495,386 | 2/1970 | Bixler | 55/367 |
| 3,724,179 | 4/1973 | Leinfelt | 55/367 |
| 4,074,458 | 2/1978 | Catlett | 43/139 |
| 4,175,352 | 11/1979 | Catlett | 55/367 |
| 4,279,095 | 7/1981 | Aasen | 55/367 |
| 4,607,451 | 8/1986 | Jarecki | 55/367 |
| 4,733,495 | 3/1988 | Winnicki | 43/139 |
| 4,794,725 | 1/1989 | Numerick | 55/367 |

Primary Examiner—Richard K. Seidel
Assistant Examiner—Chuck Y. Mah
Attorney, Agent, or Firm—Alfred E. Miller

[57] ABSTRACT

An electric insect trapping device having a vacuum pump in a hollow body and a removable nozzle, and an insect receiving cage, or container, for trapped insects. The nozzle, when attached to the hollow body, has a rearwardly extending part that penetrates through a self-closing opening in the cage. When the nozzle is detached from the hollow body the opening in the cage automatically closes, thus preventing the contents thereof from escaping.

3 Claims, 3 Drawing Sheets

SUCTION INSECT TRAP DEVICE

The present invention relates to a hand-held battery-operated, motorized, vacuum-operated insect catcher with a self-sealing insect cage or throw-away capture bag.

BACKGROUND OF THE INVENTION

It is well known that garden pests, such as leaf eating beetles, such as Japanese beetles, squash beetles, Mexican bean beetles, potato beetles and the like in the past were best disposed of by hand picking these pests from outdoor garden plants and flowers. However, this method is not only time consuming but one may not be sure that all the pests are disposed of when working in a garden with heavy vegetation.

DESCRIPTION OF THE PRIOR ART

Vacuum-operated fly or other insect catching devices are known, such as U.S. Pat. No. 1,797,557 to Stine et al and U.S. Pat. No. 4,074,458 to Catlett. However, there are drawbacks to the devices of the prior art, such as containers or cages for trapped insects that are not sealed, as well as containers that are not easily handled and transported.

SUMMARY OF THE INVENTION

It is an object of the present invention to provide an insect receiving cage which is disposable and in which the opening of the cage is so constructed to open when the nozzle of the device is assembled with the housing of the vacuum device and when the nozzle of the vacuum cleaner is pushed inwardly, into an operative position, and the cage is closed when the nozzle is disassembled from the device. Thus, the cage construction prevents the insects from escaping therefrom even when the cage is disassembled and separated from the device for disposal.

It is a further object of the present invention to provide a suction insect trapping device which is especially suitable for removing leaf eating beetles from plants and flowers, without injuring said plants or flowers.

In order that the present invention will be more clearly understood, it will now be disclosed in greater detail with reference to the accompanying drawings in which:

DESCRIPTION OF THE PREFERRED EMBODIMENTS

Figure 1:
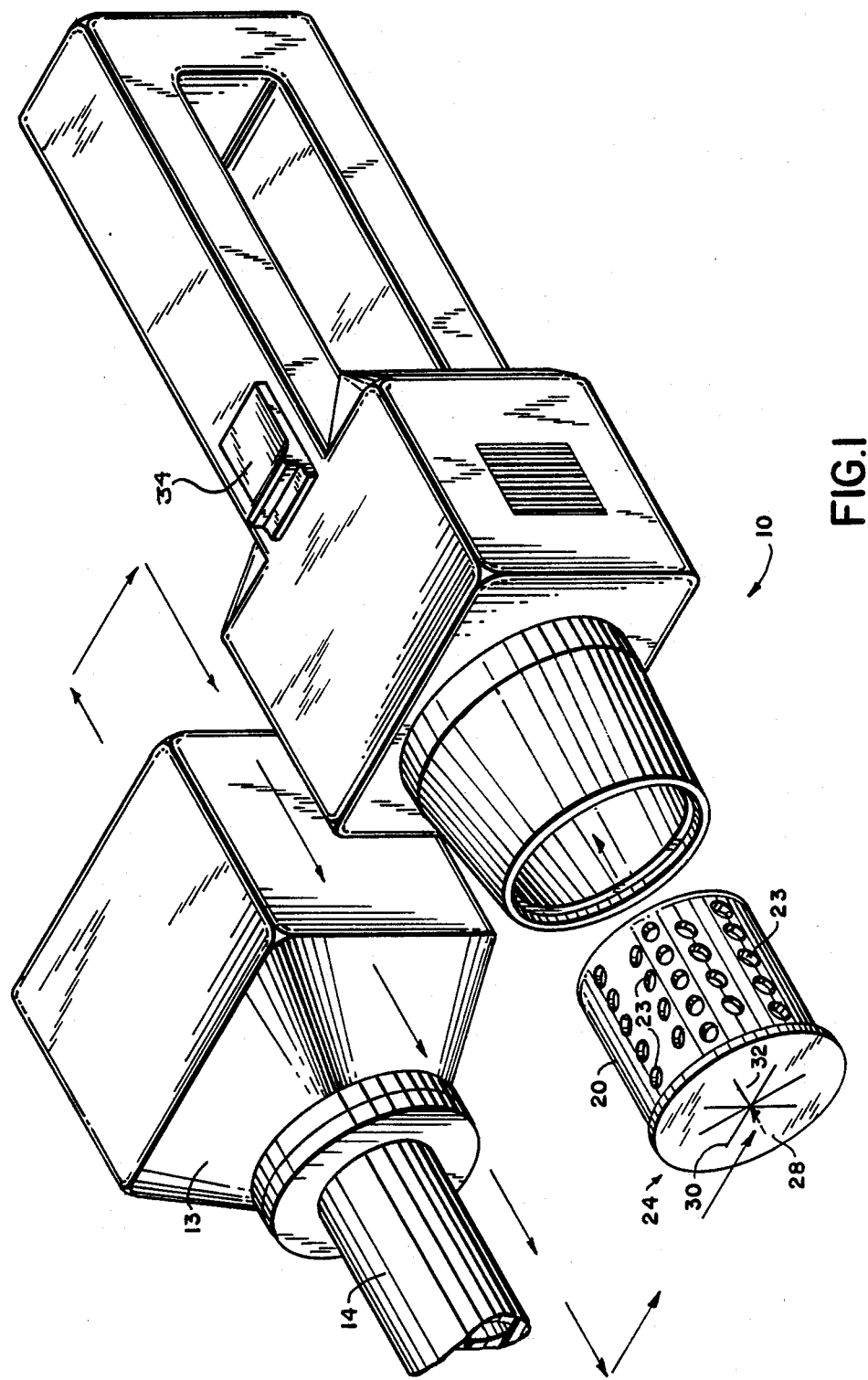
FIG. 1 is an exploded perspective view of the vacuum operated insect catcher constructed in accordance with the teachings of my present invention.
Figure 2:
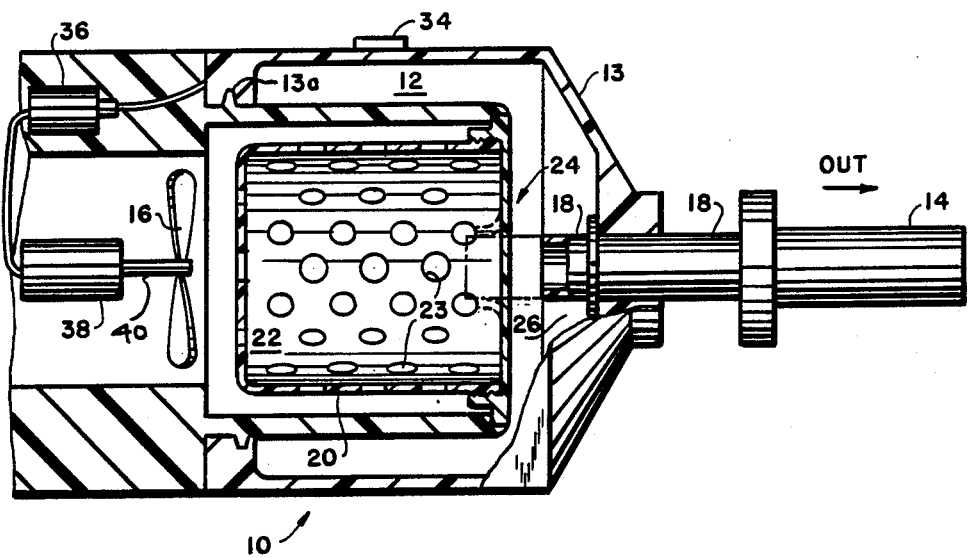
FIG. 2 is a side elevational view, partly in section, of the hand held, motorized, vacuum-operated, insect catcher constructed in accordance with the teachings of my present invention.
Figure 3:
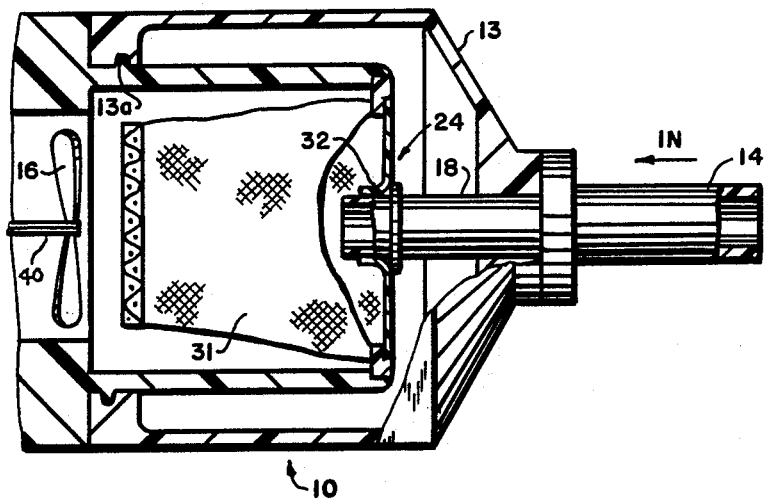
FIG. 3 is a view similar to FIG. 2 showing an alternative embodiment of the present invention.
Figure 4:
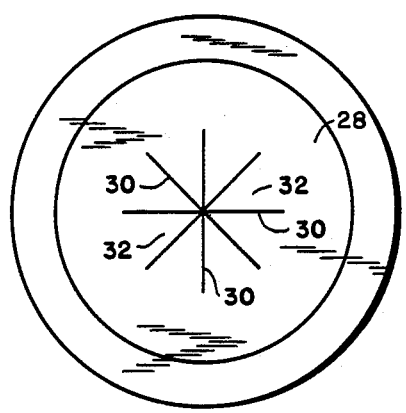
FIG. 4 is a front elevational view of the cage or receptacle for collecting insects.
Figure 5:
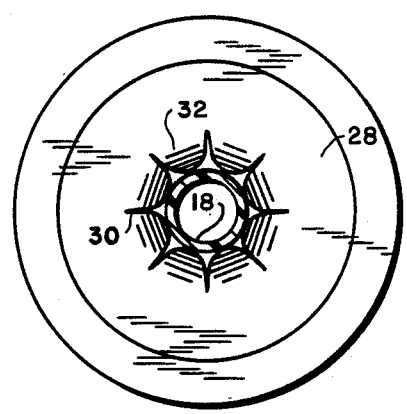
FIG. 5 is another front elevational view in which the extension tube is shown projecting into the filter bag.
Figure 6:
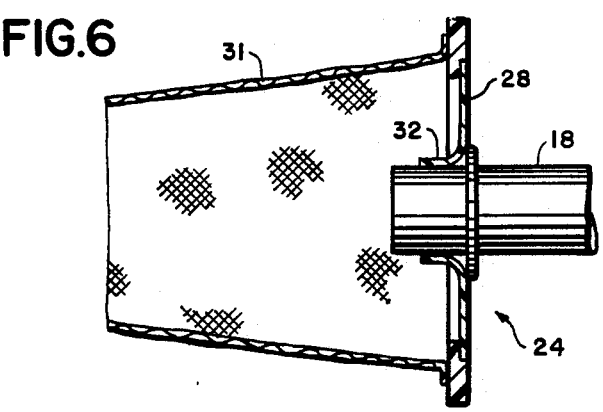
FIG. 6 is another elevational view showing the extension tube from the nozzle penetrating the slitted openings of the cage or receptacle.

Referring to FIGS. 1, 2 and 3, a suction insect trap device that is illustrated is referred to generally by the reference numeral 10 and which comprises essentially of a hollow body 12, a cover 13 for the hollow body having a nozzle 14 projecting forwardly from the hollow body 12, as well as a vacuum fan 16 located in the rear of the hollow body 12. The nozzle is provided with a rearwardly extending spindle or tube 18. Located within the hollow body portion 20 is a cage 22, having relatively minute openings 23 and preferably fabricated of plastic. At the front of the cage 22 is a self-closing opening referred to generally by the reference numeral 24. Referring to FIG. 4, the self-closing opening takes the form of a flexible sheet or diaphragm 28 having linear intersecting slits 30 therein. The sheet 28 is of the type of flexible sheet having a memory whereby the slits will bend inwardly when penetrated by the rearwardly extending tube 18 connected to the nozzle 14, but will be restored to its flat closed linear position when the tube 18 is withdrawn from the cage 22, as seen in FIG. 3. The penetration of tube 18 within slits 30 whereby the flaps 32 hug the outside diameter of tube 18 is clearly shown in FIGS. 4, 5 and 6 of the drawings.

Although a rigid thermoplastic cage 22 is shown in FIG. 1 for collecting the insects that are drawn in by vacuum, it is within the scope of the present invention to provide a paper or cloth mesh bag 31 for capturing insects or bugs, which is of the throw-away type, as seen in FIG. 3. In this connection, the tube 18 also penetrates through the slits 30 and the flaps of the slits engage the outside diameter of the tube in a tight manner so that no bugs or insects will escape. Consequently, it is clear that when the tube is withdrawn the slits revert back to their flat, linear position and the bugs are trapped within the cage or throw-away bag, and will not be able to escape.

The present invention contemplates the use of rechargeable batteries so that the device can be continually in an "on charge" condition, and ready for immediate use when necessary.

An electric momentary switch 34 is mounted on the cover 13 and is operatively connected to a rechargeable battery 36 which powers a motor 38 having shaft 40 that is adapted to rotate the fan blade 16.

It should be apparent that the nozzle 14 with integral cover 13 is preferably screw-connected to the hollow body 12 as seen at 13a in FIG. 2 when in use. However, when the cover 13 and nozzle 14 are unscrewed from hollow body 12 the flaps 32 of the slits of the flexible sheet or diaphragm 28 will close to assume their linear condition, as seen in FIG. 4, and the insects trapped in the cage 22 will be prevented from escaping when the cage is removed from the insect trap device, for disposal of the contents thereof.

Although the present invention has been disclosed and described with reference to two embodiments thereof, it should be apparent that other variations and modifications may be made, and it is intended in the following claims to cover each said variation and modifications as follows within the true spirit and scope of the invention.

What I claim is:

1. A motorized, hand-held portable suction insect trap device consisting of a hollow body, a power source constituting a battery, and a switch means for activating said device, a cover for said hollow body having a forwardly directed nozzle, a vacuum fan in said hollow body, a cage receptacle having spaced holes therein and positioned between said nozzle and said fan, a single normally flat flexible sheet having a plurality of intersecting slits forming flaps and constituting the closed front wall of said cage, said nozzle being provided with a rearwardly extending tube communicating with said nozzle and when the cover is connected to said hollow body said tube penetrates through said front wall whereby said flexible flaps are forced inwardly into said cage to a position whereby said flaps intimately engage the exterior surface of said tube so that insects are drawn by vacuum into said cage once the device is operative, and when said cover and nozzle are detached from said hollow body said tube is withdrawn from said aperture and simultaneously the flexible flaps are self-closing thereby restoring said flexible sheet to its original flat closed condition to trap the captured insects in said cage.

2. A motorized, hand-held, portable suction insect trap device as claimed in claim 1 wherein said slits are linear and angularly arranged relative to each other.

3. A motorized, hand-held, portable suction insect trap device as claimed in claim 1 wherein said cage is a cartridge having a single flexible sheet constituting an opening in the form of intersecting slits that have a memory whereby when the slits are bent inwardly to form an aperture when penetrated by said rearwardly extending tube said slits intimately engage the exterior surface of said tube, and when said tube is withdrawn from said aperture formed in said sheet said flexible flaps are restored to their original flat closed condition.

* * * * *